(12) United States Patent
Boydstun et al.

(10) Patent No.: US 7,257,834 B1
(45) Date of Patent: Aug. 14, 2007

(54) SECURITY FRAMEWORK DATA SCHEME

(75) Inventors: Ken Boydstun, Carrollton, TX (US); Bharath Kuruvalli, Irving, TX (US); Bala Balasubramanian, Irving, TX (US); Steve Marshall, Ennis, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 834 days.

(21) Appl. No.: 10/284,809

(22) Filed: Oct. 31, 2002

(51) Int. Cl.
H04L 9/32 (2006.01)
G06F 7/04 (2006.01)
G06F 17/30 (2006.01)

(52) U.S. Cl. .................. 726/1; 726/6; 726/18; 707/9

(58) Field of Classification Search .............. 726/1
See application file for complete search history.

(56) References Cited

U.S. PATENT DOCUMENTS

| | | | |
|---|---|---|---|
| 5,787,428 A * | 7/1998 | Hart ................... | 707/9 |
| 5,911,143 A * | 6/1999 | Deinhart et al. ....... | 707/103 R |
| 6,070,244 A * | 5/2000 | Orchier et al. .......... | 726/1 |
| 6,721,888 B1 * | 4/2004 | Liu et al. ............... | 713/191 |
| 6,941,465 B1 * | 9/2005 | Palekar et al. .......... | 726/1 |
| 6,950,818 B2 * | 9/2005 | Dennis et al. .......... | 707/3 |
| 7,181,761 B2 * | 2/2007 | Davis et al. ............ | 726/1 |
| 2001/0027481 A1 * | 10/2001 | Whyel .................. | 709/218 |
| 2002/0073072 A1 * | 6/2002 | Fukumoto .............. | 707/1 |
| 2003/0004960 A1 * | 1/2003 | Pressmar ............... | 707/100 |
| 2003/0023868 A1 * | 1/2003 | Parent .................. | 713/200 |
| 2003/0036989 A1 * | 2/2003 | Bhatia .................. | 705/36 |
| 2004/0128557 A1 * | 7/2004 | Sakushima et al. ...... | 713/202 |
| 2005/0120244 A1 * | 6/2005 | Choi .................... | 713/201 |
| 2006/0005229 A1 * | 1/2006 | Palekar et al. .......... | 726/1 |
| 2006/0136437 A1 * | 6/2006 | Yamasaki .............. | 707/100 |

* cited by examiner

Primary Examiner—Christopher Revak

(57) ABSTRACT

The present disclosure is a method for bridging requests for access to resources between requestors in a distributed network and an authenticator servicing the distributed network. The bridging mechanism has security features including a naming service for machine authentication and machine process rules to authorize what process machines can perform. The security proxy bridge intercepts an access request, and checks the IP address for machine authentication as well as the machine process rules and if both verifications are successful, the bridge then forwards the request for access to the authenticator. The security proxy framework utilizes a data structure that provides a method for storing selected security information stored as data records supporting an authentication and authorization system for users to access resources on multiple components of a distributed network supporting multiple business units of an enterprise. Primary authentication information stored herein includes general user information, security information, and contact information.

14 Claims, 3 Drawing Sheets

SECURITY FRAMEWORK DATA SCHEME

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes database architecture for authentication and authorization services. More particularly, embodiments of the present invention provide architectures to increase database security and flexibility.

BACKGROUND OF THE INVENTION

A number of third-party vendors market software which provides authentication and authorization services. One example is a service that protects web-based resources. When a user enters a valid login ID and password, the authentication and authorization service retrieves the user's data from a database and displays a personalized HTML page. These authentication software packages (also referred to herein as "authenticators") store and organize the authentication information in various datastores (databases, directory services, etc). In keeping with the secure nature of the information many of the vendors use proprietary schema and/or encryption to store such information. While this provides added security to that vendor's system, it also makes it more difficult to increase and/or customize modifications to desired levels of security within a large database.

SUMMARY OF THE INVENTION

A preferred embodiment of the present disclosure addresses a data structure for storing selected security information in support of an authentication and authorization system supporting multiple components of a distributed network. The preferred embodiment starts with a structure containing primary authentication information. In various embodiments different additional structures are subordinate to the primary authentication structure within the overall data structure. These structures include a structure containing general alternate authentication information, a structure containing legacy authentication information, and a structure containing administrative information for administrative activity within the components of the overall data structure. In some embodiments the alternate authentication structure may include either or both of two structures subordinate to the primary authentication structure, a security question structure and a general alternate authentication structure. In other embodiments other structure subordinate to the primary authentication structure could include a structure containing group information and a structure containing user information. The group data structure (the structure containing group information) may additionally be crosslinked with the administrative structure (the structure containing administrative information). The user structure could include either or both of two structures subordinate to the primary authentication structure, a structure containing user account information and a structure containing miscellaneous user information. For all of these data structures it is preferred that the direct relationship between any individual components of the structures, i.e. between any superior or subordinate associated structures, is not a many to many relationship. Stated in a positive fashion the relationship between directly associated structures is preferably a one to many, many to one, or (in the simplest case) one to one.

In an alternative embodiment, a method is provided for storing selected security information in support of an authentication and authorization system providing authentication and authorization for users to access resources on multiple components of a distributed network supporting multiple business units of an enterprise. The method preferably includes storing selected security information for users for all systems in a domain in a common authentication datastore supporting a common authentication and authorization system. In its most preferred embodiment the method includes excluding contact and business related information for each user other than a primary e-mail address. In various embodiments, excluded contact information includes addresses and phone numbers for each user. Similarly, excluded business related information may include account numbers of each user with business units of the enterprise, but an account number of the user with the authentication and authorization system is preferably not considered business related information to be excluded. Excluded business related information may include billing and payment related information for each user.

DETAILED DESCRIPTION OF THE PREFERRED EMBODIMENTS

Security Management with a Security Framework

Business is constantly changing today. With the introduction of e-business, enterprises have had to change the very nature of how they view security. In fact, controlling and managing security within an enterprise has become a primary concern for many managers across the e-business world.

With present day global markets and intense competition, even the best organizations are being met with increasing challenges. Internal users (employees) and external users (customers) need access to the latest information, instantly, anytime and anywhere. Many companies have responded by placing applications and information on their corporate network. However, this introduces the problem of how to provide easy, efficient access to users both inside and outside the company, without exposing the network and vital resources to attack. Therefore, it is desirable to find secure web traffic management solutions.

Company resources are valuable for every organization, and therefore have to be protected from unauthorized access.

The degree of security placed on these resources may vary depending on the sensitivity of content and the intended user community. The challenge is to implement a secure integrated access control environment, while simultaneously being able to support multiple authentication mechanisms and appropriate session controls. Security management can be centralized to ease management of large numbers of user privileges and entitlements across all applications and platforms. This can be implemented by establishing a security framework within the organization's network. Two components of such a framework are a datastore for security information and a bridge between the back-end security system and the rest of the enterprise network. While this application discusses both to provide appropriate context, its claims focus on the datastore, while a co-pending application filed this same date entitled Security Framework Bridge (U.S. Ser. No. 10/284,680) has claims focusing on the bridge and is herein incorporated by reference.

Within a security framework, one technique is to set up a security proxy as a bridge between the applications and the resources. In this instance, a security proxy can be considered as a bridging mechanism that provides mapping between objects from different platforms and/or architectures. A security proxy server is sometimes used to filter requests. For example, a company could use a proxy server to prevent its employees from accessing a specific set of protected web sites.

Security Proxy Framework

Figure 1:
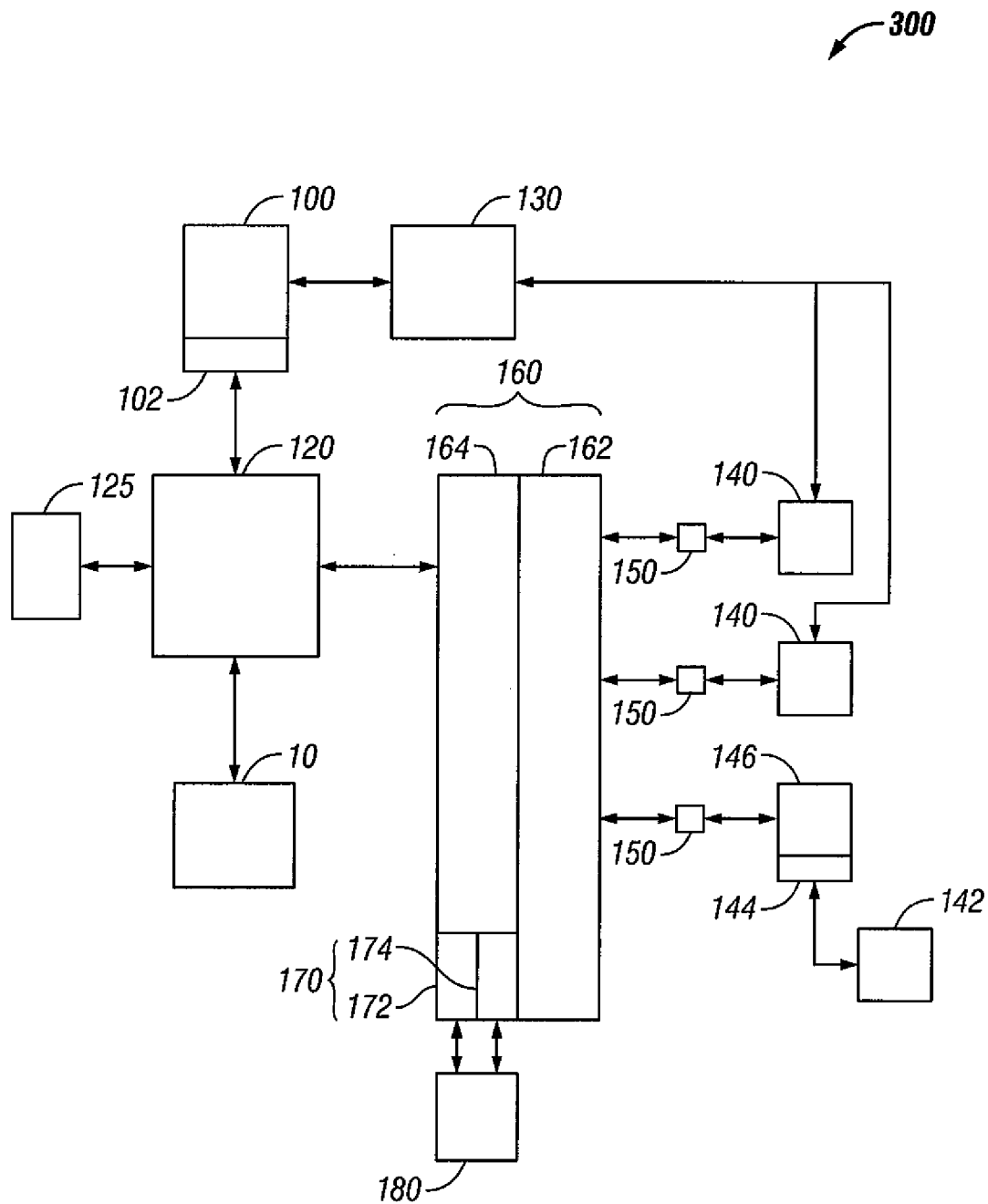
FIG. 1 is a model of a security proxy framework.

FIG. 1 depicts the most preferred embodiment for the security proxy framework. The security proxy framework provides a method for bridging requests for access to resources between requesters in a distributed network and an authenticator servicing the distributed network. The request for access includes requests to view, delete, add, or modify the requested resource. In the most preferred embodiment, the security proxy framework 300 consists of a three-tier design consisting of a front-end application layer, a middle-tier bridge component, and a back-end implementation layer. The application layer comprises the application servers 140, the generic security API calls 150, and in theory includes the front-end piece of the bridging mechanism, the public Java interface 162. The middle-tier bridge (also referred to as the security proxy bridge) is a system supplying the bridging mechanism to security proxy framework 300. It is comprised of the security proxy bridge 160 that is a representation of the whole bridging mechanism. Within the mechanism are the public interface to the application servers, the public Java interface 162, and the private interface, preferably a private CORBA interface, 164, that communicates with the back-end security framework functions. The implementation layer refers to any of the back-end functions directed upon determining where security decisions are made, such as policy decisions.

Security Proxy Bridge

The public side of the security proxy bridge 160 includes not only the front-end side of the bridge, the public Java interface 162, that is accessed by the application servers, but also the generic security API calls 150. The public side can be thought of as the side of 300 involved indirectly with serving the public, that is the public, or users, access the calling application servers 140, with their requests. The private side of security proxy bridge 160 is the back-end side that functions to process the security requests. All application-programming interface (API) invocations will be intercepted by security proxy bridge 160, which in turn will call the appropriate back-end security functions. Accordingly, the applications are completely encapsulated with the back-end implementation details. Also, addition or removal of back-end functionality will have minimum code-impact on the application layer. Therefore, the security framework design has flexibility to allow future security requirements to be integrated easily with minimal impact on the application code.

In the most preferred embodiment, private CORBA interface 164 of the security proxy bridge 160 contains a bridging mechanism that is coded using Common Object Request Broker Architecture (CORBA). CORBA allows applications to communicate with one another no matter where they are located or who has designed them. CORBA is utilized because of its performance, stability, capacity, and cross platform capabilities. CORBA also provides management, administration and logging facilities. CORBA performs well in a completely heterogeneous framework. Using CORBA one can go straight from a mainframe to a web server. One can, in fact, use CORBA to do router table updates if desired.

Public Java interface 162 located on the front end of security proxy bridge 160 is the public interface that is coded in Java. Java is a general-purpose object-oriented programming language with a number of features that make the language well suited for coding applications. All API calls are sent to the Public Java interface 162.

One benefit the security proxy bridge 160 provides is an insulation layer in the overall security framework. On one side of the security proxy are the application servers 140, such as personalized content servers, that sit behind the web servers 100 and 130. On the other side is a security framework database scheme 10.

The security proxy bridge 160 can access the authenticator in place on its behalf. The security proxy bridge 160 server sends its requests to the authenticator policy server 120 and the authenticator handles it from there. There are generic security API calls 150 made on the front end of the security proxy bridge 160 and a security framework database scheme 10 accessed on the back end, with the authenticator policy server 120 working in between, managing the middle. After the security proxy bridge 160 forwards a request for access to the authenticator, the authenticator requests identification and authentication information regarding the requestor and authenticates the identity of the requester. The authenticator then compares the authorization policy for the requester with the requested resource and the requested access to the requested resource, and if the comparison is successful, the authenticator authorizes the request.

If the authenticator policy server 120 is changed out at some point in the future, the requests to the security proxy bridge 160 do not have to be changed. They will still make the same generic security API calls 150. The flexibility noted here is a desirable feature of the security proxy framework.

Differing from previous security proxy architectures known to the inventor, the most preferred embodiment for the private CORBA interface 164 has additional built-in security features in a security proxy security service 170. First of all, the bridge can access a security proxy naming service 180 that specifically keeps track of the application servers 140, to essentially authenticate a machine making an API call. The security proxy bridge 160 intercepts a request for access to a resource and identifies the IP address of the requester to verify the IP address has access to the resource. In the case where multiple applications reside on a single machine and therefore share an IP address, further checks may be made for verification.

In addition to this, a set of security proxy machine process rules set 174 is included, authorizing what processes various machines are allowed to perform. Once the security proxy bridge 160 intercepts a request for access to a resource and performs the machine authentication it identifies the type of request and the application acting as the requestor to verify that the application has permission for the type of request for the requested resource. If both verifications are successful, security proxy bridge 160 forwards the request for access to the authenticator.

Finally, one other security feature is that a copy of the main policy store 125 rules set is maintained on the private CORBA interface 164 in the security proxy password rules set 172, so accessing the main policy store 125 is bypassed, thereby making the system operate more efficiently.

The Application layer includes a set of generic security API calls 150 that not only replicate legacy functionality but also provide an extended set above previous authenticator frameworks. Additions to the API set include more user APIs and group APIs as well as a completely new set of create reports APIs. The generic security API calls 150 allow application groups to access information stored in the security framework database schema 10. All API invocations are directed towards the authenticator policy server 120, which will in turn interact with the security framework database scheme 10. As mentioned previously, end-user applications are encapsulated with the implementation details of the API. The end-user applications do not have visibility or direct access to the implementation server, the authenticator policy server 120, or the security framework database scheme 10. However, they do have access and visibility to the private CORBA interface 164 and public Java interface 162, as well as the security proxy naming service 180.

An advantage that the security proxy framework 300 has over prior-art legacy systems is that it has multi-threaded functionality whereas legacy systems, without a bridging mechanism, do not. At a high level, what being multi-threaded means is that application servers can open a single connection via the bridging mechanism for multiple API calls. In prior art frameworks, every time an API call is made it requires opening a separate connection. So, there is a one to one relationship for all API calls and the connection thus made for the API call. In the security proxy framework 300 the bridging mechanism enables the application servers to open a connection, and in that connection the server can make many API calls, thus demonstrating the multi-threaded feature. For example, within a local telephone division mass registrations can occur. The telephone company may sign up five to ten thousand people in a day. In the legacy system, each individual registration requires that a separate connection be made from the application server to the security information to process the requests. Therefore, to process registration requests of this magnitude, just as many connections as people would have to be opened. However, the legacy system servers would not be able to handle this volume. Therefore, the legacy system can only process a portion of the requests, by queuing them up a few at a time. In this scenario, inherent problems are common, such that part of the data could likely get lost or corrupted. With either the present or the legacy system, 10,000 API calls could not physically be made through one connection. There is a finite limit; however, with the multi-threading feature within the security proxy framework 300, a very large number, say 2,000, calls can be made through one established connection. From a network standpoint, opening only five connections to process 10,000 API calls, is much more efficient, of course, than having to open 10,000 connections to do the same thing. In the current system of this invention the connection is held open and can be referred to as a persistent connection. It makes the connection persistent by opening the connection and holding it open so the application servers can make all their API calls much more efficiently.

Data Structures Used in Distributed Environments with Security Frameworks

Typically, large companies tend to build datastores combining user data. They contain multiple types of user information, both security-related information (such as user id, passwords, and security related secret questions) and general account related information (such as user account number, user address, user phone number, user phone options available, and whether a user is late on their bill). A large, ambiguous user datastore, such as this, not only handles the security related user data, but it also handles any policy decision information and authentication. Advantages of having all data stored together depend on which authentication service is in place. Some authentication services operate more efficiently when all user data, including security related information and general account related information, is combined into one large, ambiguous datastore. Some authentication services might only be able to operate, for proprietary reasons, when all user data is combined into one large, ambiguous datastore.

However, for some, having one large, ambiguous user data store can create a security problem in that restricted information is mixed in with general account related information. Then various applications requiring only general account related information could access the user datastore that also contains the restricted information, therefore creating a potential security risk. Fortunately, some authentication services allow for more flexibility as to how the data is stored than those already mentioned.

It can be a desirable feature in a security framework database scheme to have a completely separate security related user datastore that only deals with security related information. Having a security related user datastore can more easily restrict users through the use of routers, security proxies, APIs, etc. Furthermore, separating security related user information from general account related information enables modifications to be made to either datastore without affecting the other datastore. From a security aspect, one can give an application the ability to allow authorized users to make changes to the security related user datastore without having to give the same authorization to all of the applications which might need access to a general store. Hence fewer applications and/or machines will need to be provided access allowing more to be screened away by hardening methods. Having a segregated security related user datastore enables the ability to have a focused optimized security database that limits control and hardens it from a security standpoint.

Another desirable feature in a security framework database scheme is to optimize strictly for security mechanisms, thereby cutting down on unnecessary data. One would not have to store contact and business related information. Contact-related information can include things such as user account number, user address, or user phone number. One would not have to store any information pertaining to user phone options available or whether a user is late on their bill. This type of information is account-related information that the authentication service can store somewhere else. Only security related information such as user id and user password is stored in the security related user datastore. Excluded business-related information can include such items as account numbers of users and billing and payment related information such as date and amounts of last payments, accounts receivable information, information regarding the amount and breakdown of recent or historical invoices, and the like.

Another desirable feature in a security framework database scheme is that the information contained within the security related user data store is almost entirely unique. There are very few occurrences of redundant information, one example of which might be user e-mail address. Hence the creation of separate databases for security and business-related information should not add substantial redundancy to data storage, while still providing reduced demands on either datastore independently (only users of that information need to be accessing that datastore).

Primary Authentication Data Structure

Figure 2:
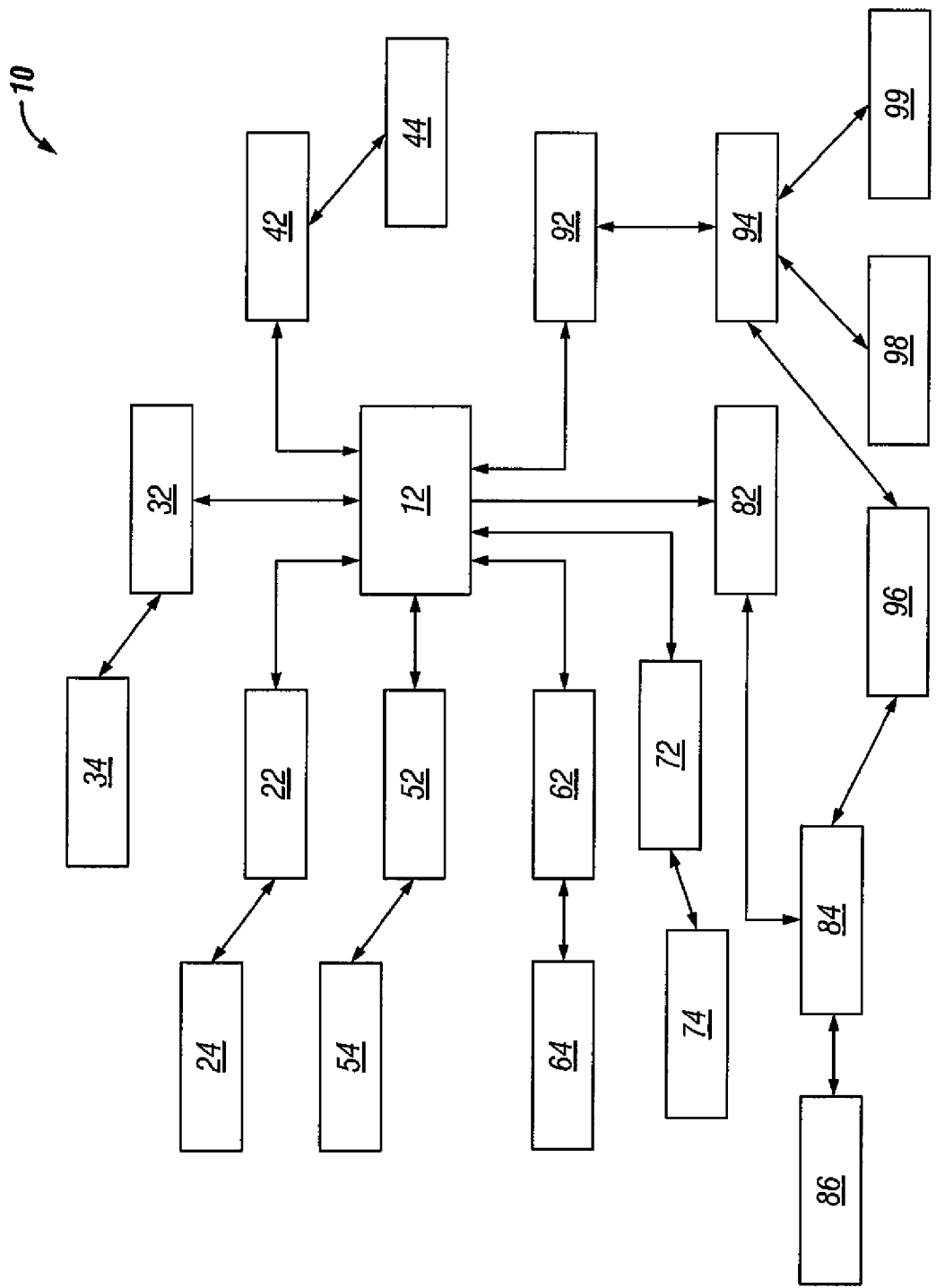
FIG. 2 is a model of a security framework database scheme.

FIG. 2 depicts the most preferred embodiment for the security framework database scheme comprising information stored as data records. A structure 12 containing primary authentication information, hereinafter referred to as primary authentication store table is the highest-level object directory, or main directory, in the hierarchical arrangement of information. These directories are also more generally referred to as data tables and even more generally as data structures. The primary authentication store table 12 contains authentication information such as passwords and is identified by the user ID number, but also includes a base line level of information regarding the main user and in fact, in most normal logins, this would be the only folder that would be reached. Logically the information stored in primary authentication store table 12 can be divided into three groups. These groups are general user information, security information, and contact information.

The primary authentication store table 12 includes general user information such as a numeric person id (user id), a user login name, and a user name (to include various forms of the name such as first name, last name, middle initial, alternate name, and distinguished name). Additional general user information stored in table 12 may include a description of the user, as well as the dates the user last successfully, and unsuccessfully logged in. Other general user information in table 12 includes the date a user was created, who created it (a user's person id), the date user information was modified and who modified it (person id). One other attribute that could be categorized as general user information is automatically generated time stamp for user modification events, which is maintained by a database trigger and is available as read only.

Some of the data defined in the security framework database schema is preferably encrypted in transit or in storage or encrypted during both. Most of these attributes are included in the security information portion of the primary authentication store table 12. Note that a secure socket layer (SSL) is used in the security proxy framework where some legacy systems do not. A SSL is a protocol for transmitting private documents, such as credit card numbers. It creates a secure connection between client and server, over which any amount of data can be sent securely.

Security information in the primary authentication store table 12 includes a user social security number. Also in table 12 is security information to include a user password (text), as well as the most recent date a user password was changed, the most recent date a user password algorithm (used for encryption) was changed, and the most recent date a user certificate was changed. Other security information in table 12 includes user token card details, status of a user login, date when user account is enabled, and date when user account expires. Two other columns of security information in table 12 are a user acf2 id and password. Note that a user social security number, a user password, and a user acf2 password are encrypted both in transit as well as in the storage.

The remaining columns of information in the primary authentication store table 12 pertain to contact information. The attributes dealing with contact information include a user email address and a user organization name (a company name where a user is employed in case of a business customer).

In the most preferred embodiment, certain data entities are excluded from the primary authentication store table 12 and the authentication datastore as a whole. These exclusions can be grouped into six categories; selected user related information, selected security related information, contact related information other than primary e-mail, selected group-related information, localization information, and business related information.

User related information such as the type of currency used by a customer is not stored in the primary authentication store table 12. Also, the ID number for a self-registered user, that in some instances of other databases may be stored, is not stored in the primary authentication store table 12. Various forms of the user name, such as the legal first name and last name, or the first and last name spelled phonetically, have been omitted from table 12. Additionally, the lower case login id of the user is not included in table 12.

Some security related history information such as the IP address or hostname of the location of the last successful or unsuccessful login is not stored in the primary authentication store table 12. Security related information for the number of wrong logins that are allowed before a user is locked out is omitted from table 12. Also, the date when a user password will expire, or the number of days after which a password will expire are also attributes that are not stored in table 12. Finally, general and idle timeout for the user account, as well as the last three old passwords, that in some instances may be stored in other databases (policy store 125 within the policy server 120), are not stored in the primary authentication store table 12.

Exclusions from the primary authentication store table 12 are made for contact related information other than the primary e-mail address such as a secondary email address of a user. Also, the address, city, state, postal zip code, country, and primary phone number of a user are not stored in table 12. Other contact related information for a secondary phone number, fax number, pager number, and cell phone number of a user are also omitted.

The only group related information excluded from the primary authentication store table 12 are the rules specifying the minimum and maximum length of a password belonging to a group. Numeric code and date code used for localization have been omitted from the primary authentication store table 12. Additional localization information that is excluded from table 12, are the code for identifying the locale, the time zone code, the local currency and the like.

Excluded business-related information can include such items as separate account numbers of users with the various businesses within an enterprise and billing and payment related information. Billing and payment related information can include information such as date and amounts of last payments, accounts receivable information, information regarding the amount and breakdown of recent or historical invoices, and the like.

The hierarchical structure of the security framework database scheme is most preferably designed to conform to a directory service, although it is presently stored within a relational database. At some point in the future, if desired, the scheme could easily be migrated into a directory service. To set up this easier migration, all relationships between tables of information in the security framework database scheme are broken down into one to many relationships (or many to one or in the simplest case one to one relationships). This is a purpose of many of the next level tables of information below primary authentication store table 12. They break down the many to many relationships between table 12 and all of the lower object directories. For example, there is a one to many relationship between table 12 and secret question cross-reference store table 22 and a one to many relationship between secret question store table 24 and secret question cross-reference store table 22. However, if table 22 were not in between tables 12 and 24, there would be a many to many relationship between table 12 and table 24. Moving from the main directory, primary authentication store table 12 down to the next level directory, table 22, and continuing on down through the directory, various additional attributes are picked up along the way.

Alternate Authentication Data Structure

A structure containing alternate authentication information is subordinate to the primary authentication store table 12. This structure is preferably made up of two structures, a secret question structure (for simple alternate authentication) and a general alternate authentication structure (for various types of higher security authentication methods). Hence, one component of this alternate authentication structure is secret question store table 24 and another is general alternate authentication store table 34. Secret question store table 24 contains information pertaining to the secret question and answer pairs used to help recover a user's forgotten password. A user can be associated with multiple questions and there can be multiple questions that a user can choose from when setting up his password. Therefore, to preserve the one to many relationships necessary for a directory service, table 22 provides a cross-reference between table 12 and table 24, as previously mentioned by breaking the tables down into one to many relationships. Table 22 contains the primary key, user id number as well as the secondary key, secret question id number. The primary key links table 12 to table 22 and the secondary key links table 22 to table 24. One other column of information stored in table 22 is the user's answer text to the particular secret question. In some instances, multiple question and answer pairs could be stored for a user.

Secret question cross-reference store table 22 and secret question store table 24 of the Security Framework Database Scheme provide a store for the secret question information for each specified user id. The security framework database scheme is a table of information that is not functional, rather it's just a physical structure which then must be driven by an application programming interface, the API calls. API calls can originate in the authenticator policy server 120 or from application servers 140.

The following example can show how the secret question stored information can be used for authentication. When a user logs in to a web server 100 to access a protected resource (typically, by clicking on a button, or specifying the URL of an application) he inputs his credentials. The web agent 102 receives the credentials and passes them to the authenticator policy server 120. Here it is determined whether the authenticator is protecting the resource. If the resource is not being protected, the web agent allows the request to pass to the protected web server 130 for processing. Otherwise, in the most common circumstances, when a user enters a login ID and a password, the authenticator policy server 120 accesses the security framework database scheme 10 to authenticate the user. The authenticator policy server 120 has a set of main policy store 125, such as a user's password must be changed every 30 days, the password must have at least 8 characters and must be alphanumeric, etc. The authenticator must make sure that the entered password is valid, checking to see if it is violating any of the rules. Once the authenticator has verified that everything is correct, it then goes into the primary authentication store table 12 in FIG. 2 to compare the entered password with the provided password. Assuming that they match, then authentication is complete, the user is displayed the web page, and no further action will be taken.

However, events can occur which will call for additional work. One example is when the user has forgotten their password. In such a circumstance, one common approach is to have ahead of time provided answers to secret questions, which provide the user an alternate means to either change or obtain his password. To provide a function for that approach, we look to the security secret question path in the security framework database scheme, tables 22 and 24. The user must enter his password when logging in. If the user has forgotten his password, the user will be prompted for such secret information as mother's maiden name, pet's name, or home address backwards, etc. which had been set up previously when establishing the password for the user.

The user id entered is found in primary authentication store table 12 and becomes the primary key that is mapped by a one to many relationship into secret question cross-reference store table 22. The text for the answer to the prompted question is also passed to table 22. The secondary key from table 22, secret question id number provides a cross-reference to secret question store table 24. This is where the secret question information that must be matched is stored. If there is a match between the answer the user gave and the stored desired response, then the user will be given either the opportunity to receive another copy of his password, or perhaps the chance to start a new password. If the user fails to authenticate, then custom pages or actions can be taken. The user could receive a personalized error page, a request to contact support page, or an opportunity to reset a password. As an additional note, in the most preferred embodiment, the user password, as well as the answer to the security question, is in fact encrypted both in transit back and forth to the user and in storage. The security question used to help the user recover a forgotten password is encrypted in transit, but not in storage.

In the previous authentication example, events follow the security check flow of the security proxy framework. However, transactions can occur that follow the application flow within the security framework. Application servers 140 may do any number of things. They may go back to the mainframe to retrieve information, they may also be for content management, or they may pull reports from other systems. In the previous authentication example, once the authenticator has verified that the user is valid and granted access to the protected web server 130, the web page is displayed. If the user has a customer account, he may actually see a button on the web page to view his bill, or there may be a button to change his options. Perhaps the user wants to add caller ID. To access this information, what actually happens is his requests are going to the application servers 140.

In another example, from an application standpoint, a user logs into the customer web page because he wants to see his bill or view his options. The authentication process (utilizing the web agent 102, policy server 120, and user store 10) authenticates him, and now he goes to the web page where he can view his bill or change his options, or pay his bill or ask for a credit because the service wasn't very good. From there, it goes to the application servers 140 to pull that data and present it back to the user. At this point what the application can then do is any kind of back end verification to make sure the user is who he says and verify that he can be allowed access to pull this kind of information.

In another example, a user has forgotten his password and calls the customer call center 142 to have them reset it. The call center has a customer call center web screen 144 pulled up on the customer call center application server 146. In order to reset his password the customer call center makes a generic API call to the Public Java interface 162 on the front end of the security proxy bridge 160. This request gets transformed into a CORBA call that's called change user password or reset user password. It's a generic call and in prior art the backend CORBA has to go to the main policy store 125 stored in the authenticator policy server 120 to perform a check. It must be checked to make sure 1) the account is not suspended, deleted or locked out, and 2) the new password being submitted meets all the rules such as it must be alphanumeric, 8 digits in length, etc. However, the added security features in the Security proxy security service 170 in the Private CORBA interface 164 treat this procedure in a more secure and efficient manner.

The other component of the alternate authentication structure is a general alternate authentication structure comprising general alternate authentication cross-reference store table 32 and general alternate authentication store table 34. A circumstance where one would need to give paths to the primary authentication table 12 may be where the resource to be accessed has a different degree of security than a simple text exchange (such as passwords or secret question responses) and a higher level of authentication is desired. In such a circumstance, the system may provide for 'flags' to be set to indicate that an alternate authentication method is required. The authentication and authorization service being used supports a wide range of authentication methods including passwords, smart cards, certificates, and tokens, as well as combinations of these methods. Based on the sensitivity of the resource defined in a policy, the authenticator can decide which form of authentication is required. Stronger authentication methods can be accessed for the highly protected resources.

Accordingly, when an alternate authentication flag occurs, a security API would move down to the subdirectory, general alternate authentication cross-reference store table 32. The subdirectory one level below table 32 is general alternate authentication store table 34. Table 34 stores information pertaining to the user's alternate authentication mechanism. Because there are many authentication types and many users, and an authentication type could have many users and the user could have many authentication types an intermediate table is provided. Table 32 provides a cross-reference between table 12 and table 34, and breaks the tables down into one to many relationships. There is a one to many relationship between tables 12 and 32 with the cross-referencing key being user id number and a one to many relationship between tables 34 and 32 with the cross-referencing key being user alternate authentication method code. One other column of information stored in general alternate authentication cross-reference store table 32 is the text for the user's alternate authentication method.

Multiple authentication methods can be assigned. For example, when a specific user goes to one particular resource he has to use his user ID and password. However, when he goes to a different, more protected resource he has to use a token card, and when he goes to yet another resource, he might have to use a digital certificate. All of these assignments are found within the alternate authentication tables of the security framework database scheme.

Legacy Authentication Data Structure

Two other paths in the security framework database scheme include several tables of information related to a legacy authenticator. If one is to migrate from one authenticator to a new authenticator, certain advantages may be obtained by providing a subset of information which is related to the user and their status and information about them from the prior authenticator. One advantage would be that when the migration is complete, information stored in the new authenticator could be compared with information stored in the prior authenticator to verify a successful and complete migration. It provides a backward mapping into the old authenticator. If during the migration (or in the early period following the migration) trouble in an account was encountered, the problem could be fixed by accessing these tables as a reference.

One of the paths within the security framework database scheme, allowing backward mapping into a prior authenticator includes tables of information to indicate the role or roles the user was assigned in the prior authenticator. Accordingly, to access this information a security API would move down to a subdirectory, prior authenticator role cross-reference store table 62. The subdirectory one level below table 62 is prior authenticator role store table 64. Table 64 stores information pertaining to the user's role in the prior authenticator. Because there are many roles and many users, and a role could have many users and a user could have many roles an intermediate table is provided. Table 62 provides a cross-reference between table 12 and table 64, and breaks the tables down into one to many relationships. There is a one to many relationship between tables 12 and 62 with the cross-referencing key being user id number and a one to many relationship between tables 64 and 62 with the cross-referencing key being user role code.

The other path within the security framework database scheme, allowing backward mapping into a prior authenticator includes tables of information to indicate migration status. Migration status reflects whether an individual has yet been migrated from the old authenticator to the new authenticator. Accordingly, to access this information a security API would move down to a subdirectory, migration status cross-reference store table 72. The subdirectory one level below table 72 is migration status store table 74. Table 74 stores information pertaining to the user type in the prior authenticator. Because there are many user types and many users, and a user type could have many users and a user could have many user types an intermediate table is provided. Table 72 provides a cross-reference between table 12 and table 74, and breaks the tables down into one to many relationships. There is a one to many relationship between tables 12 and 72 with the cross-referencing key being user id number and a one to many relationship between tables 74 and 72 with the cross-referencing key being user type. Table 72 contains a primary key, user id number as well as a secondary key, prior authenticator user type code. Other columns of information stored in migration status cross-reference store table 72 include the user login name, a migration code and a date user was created in the prior authenticator.

To illustrate the advantage of having prior authenticator role store table 64 and migration status store 74 as a reference for a backward mapping into the old authenticator the following example is provided. Following the migration a customer calls in to a service group representative to complain that his password no longer works. The service representative can access migration status cross-reference store table 72 to find out, first of all, if the user was successfully migrated. If he finds that the user was actually migrated, he could next check to see if the user was migrated to the appropriate role type by accessing the prior role information available in table 64. Hopefully, at some point along the way, the service group representative can find the migration error and correct the problem.

Administrative Functionality

Part of the issue when building the security framework database scheme was the functionality available within the current relational database. If one could build the user store in a directory service such as LDAP 40, there is functionality for authorization for administrative level modifications of the datastore itself. If instead the user store is in a Relational Data Base Management System (RDBMS) (such as Oracle), often the ability to use that functionality does not exist. Therefore, the desired functionality may be built as a separate mechanism to work in the RDBMS as subdirectories of information within the security framework database scheme. If a migration later takes place from an RDBMS to a directory service, the delegated administrative functions within security framework database scheme can easily be moved into the new directory service (such as LDAP 40). Basically, the APIs for these functions for the RDBMS are preferably crafted to map straight into the LDAP supported functions without need for recoding.

In the most generic sense, one must be concerned about what the customer on the street can do. The customer could access the website and have the ability to view their bill, whether its local or long distance telephone service, and they could have the ability to change their phone options. That is the extent of what they should have the ability to do. A user on the street must not have the ability to give themselves credit. Additionally, one must be concerned about what the customer service representative can get access to and make changes to. These concerns are a big security issue. The customers have a classification with one very limited set of rights. Alternatively, the internal people, such as the customer service representatives or departmental managers, may have a wide range of specific rights according to their specific level within the organization, so it is preferred to allow this group of users a more granular access to the security framework database scheme.

To delegate the administrative activity within the security framework database scheme, a structure containing administrative information for administrative activity within the components of the overall data structure is present and is subordinate to primary authentication table 12. This administrative data structure is cross-linked to a separate subdirectory dedicated to information dealing with group assignments of users. The group structure is also subordinate to primary authentication store table 12. The purpose of this delegated administrative functionality within security framework database scheme, on a more granular level, is to give internal users, such as managers, the ability to make administrative changes. These changes, such as to reset a password or credit an account, should specifically, only be made by users that the have authority to do so. For example, in an application a manager may have the ability to reset one of his employee's password or he may have the ability to change what they can or can't do. When the request to make that change is made, a check is made within the security framework database scheme to make sure that the manager is who he says he is, and that he has the ability to make that change. It is desirable that this check be performed to prevent an administrator of a certain group from resetting a password of a user in another administrative group. They should not have the authority to do that.

Accordingly, to access this information dealing with group assignments of users from the security framework database scheme a security API, after login, would move down to a subdirectory, group cross-reference store table 82. The subdirectory one level below table 82 is group store table 84. Table 84 stores information pertaining to a user's assigned group. Within table 84 are columns of information storing group id number, group name, code associated with the group, and tracking information such as date group was created, user id who created the group and date of any modifications to group as well as person who made the modification.

Because there are many groups and many users, and a group type could have many users and the user could have many group types an intermediate table is provided. Group cross-reference store table 82 provides a cross-reference between primary authentication store table 12 and group store table 84, and breaks the tables down into one to many relationships. There is a one to many relationship between tables 12 and 82 with the cross-referencing key being user id number and a one to many relationship between tables 84 and 82 with the cross-referencing key being group id number. Two other columns of information stored in group cross-reference store table 82 are the date person was assigned to the group and the user id of the person who made the assignment. Again, the last two attributes store information valuable for tracking purposes. This is an improvement worth noting because legacy security frameworks tend to have fairly limited logging facilities.

Tracking information

Tracking information such as created date, created by, modified date, and modified by offers several advantages. One advantage is to be able to discover historically which group within the company originated the customer. The following examples are included to demonstrate how the tracking information benefits a multidivisional telephone service provider company. In the following examples several divisional groups are identified such as local telephone division, long distance division and wireless division.

In the first example, to identify a long distance customer as belonging to a wireless group and a local telephone group does not provide as much usable information as would be desired. However, with tracking information available one can look through the recorded history of the customer and find more valuable event and date information. On Jan. 1, 2001, the wireless group who had the administrative authority to create new wireless users created the customer as a wireless user. The long distance customer was assigned to a wireless group. On March 15, the long distance customer also became a local telephone customer. At that point, the user became a local telephone customer so it became necessary to be able to manage the user's ability at that level. Therefore, the wireless group gave the local telephone group the ability to add the customer to their local telephone group. On June 20, the customer also became a long distance customer and so the long distance group also had to manage the user's ability, so the customer was added to that long distance group.

At this point one can ask who is the owner of this account? Who is primarily responsible for this customer? Looking through the history on this account shows that the wireless group created it initially into the system. However, as recorded, further events happen. On Oct. 15, 2001 the user is angry at his wireless phone service and decides to go to a different wireless service provider. Therefore, the wireless group deletes the customer from their group. The customer no longer is assigned to the wireless group and now is considered a long distance user, because they have the last origination point.

When the need arises to do something to this customer, it is very helpful to know who owns the customer. Without the tracking history one can have no idea because all three divisions have had their group assigned to the customer at some point. From a business standpoint, a provider wants to know that the customer is a part of three separate groups and should be treated accordingly to the policy issues in each group. At the same time, the account should be funneled into one billing. The business wants to know that the customer that added long distance on Mar. 15, 2001 originated as a wireless customer. This allows credit to be given to the wireless group for taking one of their users and cross selling them into another business.

Another advantage of storing tracking information is to enable a solution when contention occurs. For example, a customer that is both a long distance customer and a wireless customer at the same time could be trying to reset his password, a procedure that only takes a millisecond to execute. Both service groups would have a representative responsible for resetting this customer's password. Without tracking information it would be difficult to decide which group wins. However, by accessing the tracking information, it can be found that the customer is ultimately a wireless customer. So in a security proxy system, if contention occurs from two calls at the same time, the system should compare the groups and roles of the oldest group for the customer to determine which representative's request should be granted. The system would then throw an error back to the other one with a message requesting him to call in to the service center for an explanation.

Another example of how useful the tracking information can be follows. In this instance, there is a wireless manager who calls a long distance manager. He is upset because one of his customers had their password changed, and they happen to also be a long distance customer. The long distance group was the one who initiated them into the system. Now everyone wants to know who changed the password? With the tracking information available, one can find that it was the long distance group that changed the customer's password. It is via this logging mechanism that a system processor tracks the group that had this function to do a change of password and changed it. Now, the long distance manager can tell the angry wireless manager who changed the password.

Group Data Structure

Two paths are possible from table 84. One path maps in to a lower level subdirectory for groups information in group type store table 86, and another path maps into an administrative function path as a cross-referencing device. Before the authenticator can authorize a request, the authenticator first identifies the groups the requestor belongs. The authenticator then compares the authorization policy for the requester with the requested resource and the requested access to the requested resource. Next the authenticator compares the authorization policy for the requestor's groups with the requested resource and the requested access to the requested resource.

In group type store table 86, the information stored includes a primary key, a code associated with group, that ties it to group store table 84. Also stored in table 86, are a description of the group and the minimum and maximum length of the user login id belonging to this group.

For example, a user logs in through the entry system in primary authentication store table 12. To associate them with a group, an API moves to tables 82 through 86. If a person is in that group, that group has certain rights and responsibilities that are defined as events and resources within the administrative policy store.

For instance, when a customer calls in to a long distance call center and says he does not remember his password, that call center representative has to have the ability to reset his password. They can tell him what it is and he can get access to his account information. So they must have the administrative function authority to reset passwords, but only for long distance customers since they are a long distance call representative. In another similar situation, you could have a specific application currently used for some of the field agents. If they have trouble with an order, they can call into their support personnel who have the ability to go in and make modifications to their account. All of this is done through the generic security API sets. The only administrative tasks that a customer can do are self-management, such as to change his own password, differing from the previous example where he had forgotten his password and it was reset for him by an appropriate administrative function.

When a customer is assigned to a group, it really doesn't give the customer a whole lot of power. The customer is either a member of that group or not. On a more granular level, an internal user, such as a call center representative can be assigned to be in an administrative type. The administrative type has certain functions, such as to reset a password or apply credit to an account, etc. Perhaps it is desired to give the call center person the authority to reset a password. However, it is not desired to let the call center people credit an account. In this instance, it is desired to have a supervisor of the call center to be the only person who could actually authorize a credit. This is more like a business to customer world. Here customers are grouped so that they can get access to the site and administrators are grouped at a more granular level, defining what types of administrative tasks are allowed.

Administrative Data Structure

A generic subset of administrative policy function, such as read, input, or delete, are separated from the main policy store 125 and maintained in the security framework database scheme. Because none of these procedures have to go through the main policy store 125, the main policy store operates faster and more efficiently.

Accordingly, to access this generic subset of administrative policy function a security API would move down to a subdirectory, application-administrative function cross-reference store table 92. The subdirectory one level below table 92 is application-administrative function store table 94. Table 94 stores information pertaining to the type of administrative user. Within table 94 are columns of information storing a primary key, a code associated with the administrative function application, its description, a code for the administrative function, and the application name. Also stored in application-administrative function store table 94 is tracking information such as date administrative user type was created, user id who created it, and date of any modifications to administrative user type as well as person who made the modification. Because there are many administrative user types and many users, and an administrative user type could have many users and a user could have many administrative user types, an intermediate table is provided. Application-administrative function cross-reference store table 92 provides a cross-reference between primary authentication store table 12 and application-administrative function store table 94, and breaks the tables down into one to many relationships. There is a one to many relationship between tables 12 and 92 with the cross-referencing key being user id number and a one to many relationship between tables 94 and 92 with the cross-referencing key being user administrative user type. Two other columns of information stored in application-administrative function cross-reference store table 92 are the date the administrative user type was created and the user id of the person who made the assignment. Again, the last two attributes store information valuable for tracking purposes.

Three paths are possible from application-administrative function store table 94. One path maps in to a lower level subdirectory for group type information in group-application-administrative function store table 96. Table 96 ties back in to group store table 84 for reference purposes as mentioned before. Information in group-application-administrative function store table 96 includes the primary key, application administrative function code, and secondary key, group id number. The primary key ties table 96 to table 94 and the secondary key provides the tie to table 84. Additional information stored in group-application-administrative function store table 96 is tracking information.

Two other paths map into an administrative function table and an application table. These two tables are both used to break down one to many relationships and each provides one additional attribute of information. Application store table 98 includes the application name and application description. Administrative function store table 99 includes the administrative function code and its description.

The following examples are provided to demonstrate the add-on security features of the security proxy security service 170 in the private CORBA interface 164. Additionally, the examples demonstrate how the security APIs can access group and administrative function information from the security framework database scheme 10 to process various user requests. The Security proxy naming service 180 provides a table lookup to identify the customer call center application server 146 as a server for a specific customer service group, such as for wireless phone service. In this example, the only function that customer call center application server 146 is allowed is to reset a password. It is important that this server not be able send an API call to create a user. The Security proxy naming service 180 provides half the needed control for customer call center application server 146. The Security proxy naming service 180 controls what machines can make API calls; however, it cannot specify the kind of calls they can make. This is controlled with Security proxy machine process rules set 174, the added set of rules specifying the processes allowed for each machine. The added security features within the security proxy security service 170 actually make three checks. One check via the security proxy naming service 180 to authorize the machine and the second check of the security proxy machine process rules set 174, for the process allowed for that machine. Additionally, the security proxy password rules set 172 are also consulted to verify proper password format.

In this example, the customer call center 142 wants to reset a password, which is a valid call center application. The customer is on the phone and he needs to reset his password because he can't remember it. The call center representative logs into an internal customer call center web screen 144 to access the customer call center application server 146. The customer call center application server 146 sends a generic security API call 150 that's called reset password to the Public Java interface 162 on the front end of the security proxy bridge 160. The request is forwarded to the back-end Private CORBA interface 164 where it consults the security proxy security service 170. First, the security proxy naming service 180 is consulted to determine if the calling machine, say IP number 10.145.193.12, is valid and should be allowed to make an API call. Once verified, a machine process check is made by consulting security proxy machine process rules set 174 to determine if the customer call center application server 146 with IP number 10.145.193.12 is allowed the power to perform a process to reset a password. In this example, the authenticator policy server 120 is bypassed because the process is only concerned about a request coming from an internal web direction to verify the machine and its processes. The internal web sites on the customer call center web screen 144 are for users that are internal to the company and most likely have a GUI that the internal user, such as a call center representative, is using.

Assume that in this example a wireless service representative is trying to reset the customer's password. The administration tables of the security framework database scheme can be accessed to determine the group that the customer belongs. It is found that the customer is a long distance user. Of course, note that the customer does not have to be authenticated because all that is happening at this point is just a table look-up. The customer himself is not trying to access anything. However, the wireless service representative is logged on and making the API call. The wireless service representative does have to be authenticated with the authenticator in this example because he is the one attempting to make a change to the security framework database scheme. Additionally, the administration tables of the security framework database scheme can also be accessed to determine if the internal user has the authority to change this customer's password. A mismatch of groups between the internal user (belonging to the wireless service group) and customer (belonging to the long distance group) is discovered. Therefore, the security proxy determines that the internal user is not authorized to make this change and an error page is sent and displayed on the calling machine's screen.

In contrast to the above example, assume the customer does belong to a wireless group. The wireless service representative would therefore be approved to make the password change as requested by the customer. After the security proxy server has finished checking the machine and process with its additional security features it would send requests to the security framework database scheme from the CORBA side of the bridge. It would come into the security framework database scheme 10 in FIG. 2, entering into the primary authentication store table 12 to determine who the internal user is. From here it would take path 90 to application-administrative function cross-reference store table 92. In table 92 it does an update on the internal user's account and looks for his administrative function, which is pulled from application store table 98 and administrative function store table 99, where all the administrative functions are defined.

Thus, two checks are being made. First, from administrative function store table 99, the administrative function is checked, and then from application store table 98, where it checks who has password reset only authority for this application. Next, to determine what group the customer belongs to a cross-reference is made by entering group-application-administrative function store table 96. It says that basically the internal user does have the ability to reset a password for this application. At this point, a table look-up is performed for the customer to determine the group he belongs to. It maps directly back in to group store table 84, to reference the group information for the customer. It all takes about 2 seconds. The verification that the wireless call center representative is allowed to change the wireless customer's user password is then forwarded back to the security proxy. Next, the security proxy sends a request back to the internal user for the new password.

The internal user enters in the password as requested by the customer on the phone. The password is sent in a generic security API call 150 to the Public Java interface 162 on the front end of the security proxy bridge 160. The password is forwarded to the back-end Private CORBA interface 164 where it consults the Security proxy security service 170 for the Security proxy password rules set 172. A check is made to see if the password follows all the rules as found in Security proxy password rules set 172. If the new password is a valid password then it is accepted and sent to the security framework database scheme for storage in primary authentication store table 12. A message is also sent back to the internal user indicating that the new password has been established. So in one reset password call, there is actually a series of processes occurring. Checks on the machine, the machine process, and the API call are all being made by the security proxy. The security proxy bridge 160 performs these security checks with the Security proxy security service 170, which has its own built in policy server with its own set of rules and the Security proxy naming service 180 effectively acts as a machine store to the Security proxy security service 170.

User Data Structure

The overall data structure may also include subordinate structure for user information such as information about each user's account within the computer functions of the enterprise (as contrasted with business account information within each business unit of the enterprise) and miscellaneous user information. This user information structure may encompass two separate data structures, a user account structure and a miscellaneous user information structure. The user account structure would preferably include account store table 54 containing information pertaining to the organization each user account is assigned. Accordingly, to access this information a security API would move down to a subdirectory, account cross-reference store table 52. A user can be associated with multiple organizations and an organization can be associated with multiple users. Therefore, to preserve the one to many relationships necessary for a directory service, account cross-reference store table 52 provides a cross-reference between primary authentication store table 12 and table 54, as previously mentioned by breaking the tables down into one to many relationships. Table 52 contains the primary key, user id number as well as the secondary key, account organization code. The primary key links table 12 to table 52 and the secondary key links table 52 to table 54. One other column of information stored in account cross-reference store table 52 is the user's account number.

The miscellaneous user information structure would preferably include miscellaneous information store table 44, which is basically an open directory available for any miscellaneous information that may be desirable to keep. Accordingly, to access this information a security API would move down to a subdirectory, miscellaneous information cross-reference store table 42. A user can be associated with multiple miscellaneous items of information and a miscellaneous item of information can be associated with multiple users. Therefore, to preserve the one to many relationships necessary for a directory service, miscellaneous information cross-reference store table 42 provides a cross-reference between primary authentication store table 12 and table 44, by breaking the tables down into one to many relationships. Table 42 contains the primary key, miscellaneous information count as well as the secondary key, user id number. The secondary key links table 12 to table 42 and the second primary key links table 42 to table 44. One other column of information stored in miscellaneous information cross-reference store table 42 is the text for the miscellaneous information. Two additional columns of information stored in miscellaneous information store table 44 are the description for the miscellaneous information and the application name for the miscellaneous information.

Computer Systems

Figure 3:
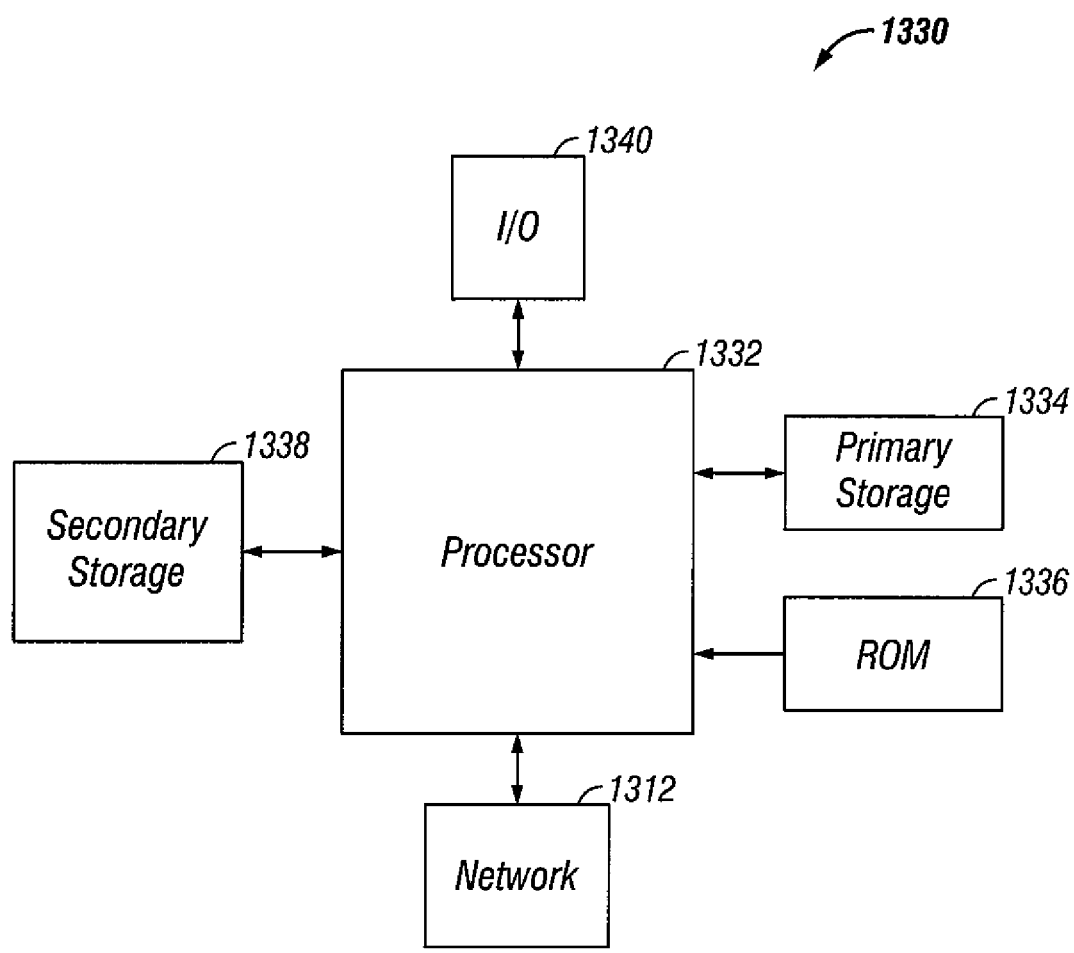
FIG. 3 is a diagram of a typical, general-purpose computer system suitable for implementing the present invention.

An authentication and authorization system as described above may generally be implemented on a variety of different computer systems. FIG. 3 illustrates a typical, general-purpose computer system suitable for implementing the present invention. The computer system 1330 includes a processor 1332 (also referred to as a central processing units, or CPU) that is coupled to memory devices including primary storage devices 1336 (typically a read only memory, or ROM) and primary storage devices 1334 (typically a random access memory, or RAM).

As is well known in the art, ROM acts to transfer data and instructions uni-directionally to CPU 1332, while RAM is used typically to transfer data and instructions in a bi-directional manner. Both storage devices 1334, 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which generally slower than primary storage devices 1334, 1336. Mass memory storage device 1338 may take the form of a magnetic or paper tape reader or some other well-known device. It will be appreciated that the information retained within the mass memory device 1338, may, in appropriate cases, be incorporated in standard fashion as part of RAM 1336 as virtual memory. A specific primary storage device 1334 such as a CD-ROM may also pass data uni-directionally to the CPU 1332.

CPU 1332 are also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above monitor programs and integrated monitoring system may be recognized as sets of computer codes and that such computer codes are typically stored in computer readable mediums such as RAM, ROM, hard discs, floppy discs, or carrier waves and the like.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

We claim:

1. A security database that stores, retrieves, and updates selected security information in response to application program interface calls of an authentication and authorization system to authenticate user identities and authorize access to resources, wherein the selected security information is stored as a data structure, the data structure comprising:
    a primary authentication structure containing primary authentication information, wherein the primary authentication structure is superior to all other structures in the security database;
    an alternate authentication structure containing general alternate authentication information, wherein the alternate authentication structure is subordinate to the primary authentication structure;
    a legacy authentication structure containing legacy authentication information, wherein the legacy authentication structure is subordinate to the primary authentication structure;
    an administrative structure containing administrative information for administrative activity within the components of the overall data structure, wherein the administrative structure is subordinate to the primary authentication structure; and
    at least one cross-reference structure that breaks down many to many relationships between the primary authentication structure and a subordinate structure into any of a one to many, many to one, or one to one relationship, wherein the cross-reference structure is subordinate to the primary authentication structure and superior to the subordinate structure.

2. The data structure of claim 1, wherein the alternate authentication structure comprises two structures subordinate to the primary authentication structure, a security question structure and a general alternate authentication structure.

3. The data structure of claim 1, further comprising:
    a group structure containing group information, wherein the group structure is subordinate to the primary authentication structure.

4. The data structure of claim 3, wherein the group data structure is crosslinked with the administrative structure.

5. The data structure of claim 1, further comprising:
    a user structure containing user information, wherein the user structure is subordinate to the primary authentication structure.

6. The data structure of claim 5, wherein the user structure comprises two structures subordinate to the primary authentication structure, a structure containing user account information and a structure containing miscellaneous user information.

7. The data structure of claim 1, wherein the primary authentication information includes general user information, a first set of selected security information, and a first set of selected contact information.

8. The data structure of claim 7, wherein the general user information includes any of a user id, a user login name, a description of the user, last successful and unsuccessful login dates, user creation date, and the date that user information was modified and the user id of who modified the user information.

9. The data structure of claim 7, wherein the first set of selected security information includes any of a social security number, a user password, a date the password was most recently changed, a date a user certificate was most recently changed, token card details, status of a user login, a date a user account is enabled, a date a user account expires, a user acf2 id, and a user acf2 password.

10. The data structure of claim 7, wherein the first set of selected contact information includes a user e-mail address.

11. The data structure of claim 7, wherein the primary authentication information excludes a second set of contact information other than a primary e-mail address, a first set of selected user information, a second set of selected security information, localization information, and business related information.

12. The data structure of claim 11, wherein the first set of selected user information includes a type of currency used, an id number for a self-registered user, alternate forms of a user name, and a lower case login id.

13. The data structure of claim 11, wherein the second set of selected security information includes an IP address or hostname of a location of a most recent successful or unsuccessful login, a number of wrong logins that are allowed before a user is locked out, when a user password will expire, and three most recent passwords.

14. The data structure of claim 1, wherein the legacy authentication structure comprises two structures subordinate to the primary authentication structure, a prior authenticator role structure and a migration status structure.

* * * * *